United States Patent
Nakano et al.

(10) Patent No.: US 8,886,534 B2
(45) Date of Patent: Nov. 11, 2014

(54) SPEECH RECOGNITION APPARATUS, SPEECH RECOGNITION METHOD, AND SPEECH RECOGNITION ROBOT

(75) Inventors: Mikio Nakano, Wako (JP); Naoto Iwahashi, Kyoto (JP); Kotaro Funakoshi, Wako (JP); Taisuke Sumii, Takarazuka (JP)

(73) Assignee: Honda Motor Co., Ltd., Tokyo (JP)

( * ) Notice: Subject to any disclaimer, the term of this patent is extended or adjusted under 35 U.S.C. 154(b) by 933 days.

(21) Appl. No.: 13/015,274

(22) Filed: Jan. 27, 2011

(65) Prior Publication Data

US 2011/0184737 A1  Jul. 28, 2011

Related U.S. Application Data

(60) Provisional application No. 61/298,928, filed on Jan. 28, 2010.

(51) Int. Cl.
- *G10L 15/00* (2013.01)
- *G10L 15/06* (2013.01)
- *G10L 15/24* (2013.01)
- *G10L 15/12* (2006.01)

(52) U.S. Cl.
CPC .................. *G10L 15/12* (2013.01); *G10L 15/24* (2013.01)
USPC ............ 704/243; 704/244; 704/254; 704/275

(58) Field of Classification Search
CPC ..... G10L 15/01; G10L 15/065; G10L 15/187; G10L 15/22; G10L 2015/0638
USPC ............... 704/243, 251, 254, 275, 244; 901/1
See application file for complete search history.

(56) References Cited

U.S. PATENT DOCUMENTS

| | | | |
|---|---|---|---|
| 6,185,530 B1 * | 2/2001 | Ittycheriah et al. | 704/255 |
| 6,370,503 B1 * | 4/2002 | Ortega et al. | 704/235 |
| 6,434,521 B1 * | 8/2002 | Barnard | 704/244 |
| 6,799,162 B1 * | 9/2004 | Goronzy et al. | 704/244 |
| 6,912,498 B2 * | 6/2005 | Stevens et al. | 704/235 |
| 7,337,116 B2 * | 2/2008 | Charlesworth et al. | 704/254 |

(Continued)

FOREIGN PATENT DOCUMENTS

| | | |
|---|---|---|
| JP | 1-237597 | 9/1989 |
| JP | 4-254896 | 9/1992 |

(Continued)

OTHER PUBLICATIONS

Bouwman, et al. "Dialogue strategy redesign with reliability measures." proceedings of the first International Conference on Language Resources and Evaluation. 1998, pp. 1-4.*

(Continued)

*Primary Examiner* — James Wozniak
(74) *Attorney, Agent, or Firm* — Nelson Mullins Riley & Scarborough LLP; Anthony A. Laurentano

(57) ABSTRACT

A speech recognition apparatus includes a speech input unit that receives input speech, a phoneme recognition unit that recognizes phonemes of the input speech and generates a first phoneme sequence representing corrected speech, a matching unit that matches the first phoneme sequence with a second phoneme sequence representing original speech, and a phoneme correcting unit that corrects phonemes of the second phoneme sequence based on the matching result.

5 Claims, 10 Drawing Sheets

(56) References Cited

U.S. PATENT DOCUMENTS

| | | | |
|---|---|---|---|
| 2002/0138265 A1* | 9/2002 | Stevens et al. | 704/251 |
| 2002/0169594 A1* | 11/2002 | Yasuda et al. | 704/5 |
| 2004/0148169 A1* | 7/2004 | Baker | 704/254 |
| 2004/0199388 A1* | 10/2004 | Armbruster et al. | 704/251 |
| 2005/0171775 A1* | 8/2005 | Doyle | 704/250 |
| 2005/0261905 A1* | 11/2005 | Pyo et al. | 704/252 |
| 2006/0116877 A1* | 6/2006 | Pickering et al. | 704/231 |
| 2006/0122837 A1* | 6/2006 | Kim et al. | 704/270.1 |
| 2007/0055525 A1* | 3/2007 | Kennewick et al. | 704/257 |
| 2007/0061139 A1* | 3/2007 | Shen et al. | 704/234 |
| 2007/0124147 A1* | 5/2007 | Gopinath et al. | 704/257 |
| 2007/0213979 A1 | 9/2007 | Meermeier | |
| 2008/0126091 A1* | 5/2008 | Clark et al. | 704/246 |
| 2009/0076817 A1* | 3/2009 | Jeon et al. | 704/240 |
| 2010/0082343 A1* | 4/2010 | Levit et al. | 704/257 |
| 2011/0077942 A1* | 3/2011 | Ljolje et al. | 704/244 |
| 2011/0161082 A1* | 6/2011 | Braho et al. | 704/251 |
| 2011/0288867 A1* | 11/2011 | Chengalvarayan et al. | 704/251 |
| 2013/0138437 A1* | 5/2013 | Cho et al. | 704/233 |

FOREIGN PATENT DOCUMENTS

| | | |
|---|---|---|
| JP | 2006-146008 | 6/2006 |
| JP | 2007-93789 | 4/2007 |
| JP | 2007-256836 | 10/2007 |

OTHER PUBLICATIONS

Wang, Lijuan et al., "Phonetic Transcription Verification with Generalized Posterior Probability," Interspeech, pp. 1949-1952 (2005).

Norihide, Kitaoka et al., "Detection and Recognition of Repaired Speech on Misrecognized Utterances for Speech Input of Car Navigation System," T.IEE Japan, vol. 122-C:2020-2027 (2002).

Japanese Office Action for Application No. 2011-011198, 4 pages, dated May 20, 2014.

* cited by examiner

FIG. 5

|  |  | RECOGNIZED PHONEME α | | | | |
|---|---|---|---|---|---|---|
|  |  | zh | φ | ng | a | b |
| INPUT PHONEME γ | zh | 7072 | 235 | 0 | 0 | 3 |
|  | φ | 20 | 0 | 7783 | 9547 | 35 |
|  | ng | 0 | 389 | 30807 | 5 | 1 |
|  | a | 0 | 129 | 22 | 92229 | 0 |
|  | b | 4 | 169 | 2 | 0 | 16235 |

FIG. 6

| FIRST PHONEME SEQUENCE | d | i | s | u |   |   |   |   |
|---|---|---|---|---|---|---|---|---|
| SECOND PHONEME SEQUENCE | j | i | s | u | p | u | r | e | i |

FIG. 7

| FIRST PHONEME SEQUENCE |   |   |   | b | o |   | o | d | o |
|---|---|---|---|---|---|---|---|---|---|
| SECOND PHONEME SEQUENCE | k | i | i | b | o | n | o | n | o |

FIG. 8

|  | 1 | 2 | 3 | 4 | 5 | 6 | 7 | 8 | 9 |
|---|---|---|---|---|---|---|---|---|---|
| FIRST PHONEME SEQUENCE | d | i | s | u | | | | | |
| GPP | 0.75 | 0.73 | 0.48 | 0.76 | | | | | |
| CORRECT ANSWER RATE | 0.92 | 0.80 | 0.73 | 0.78 | | | | | |
| SECOND PHONEME SEQUENCE | j | i | s | u | p | u | r | e | i |
| GPP | 0.21 | 0.62 | 0.53 | 0.92 | 0.44 | 0.91 | 0.54 | 0.66 | 0.88 |
| CORRECT ANSWER RATE | 0.06 | 0.52 | 0.75 | 0.96 | 0.28 | 0.94 | 0.85 | 0.50 | 0.85 |
| CORRECTED PHONEME SEQUENCE | d | i | s | u | p | u | r | e | i |

FIG. 9

|  | 1 | 2 | 3 | 4 | 5 | 6 | 7 | 8 | 9 |
|---|---|---|---|---|---|---|---|---|---|
| FIRST PHONEME SEQUENCE | | | | b | o | | o | d | o |
| GPP | | | | 0.53 | 0.52 | | 0.78 | 0.73 | 0.79 |
| CORRECT ANSWER RATE | | | | 0.74 | 0.24 | | 0.67 | 0.91 | 0.82 |
| SECOND PHONEME SEQUENCE | k | i | i | b | o | n | o | n | o |
| GPP | 0.43 | 0.63 | 0.62 | 0.54 | 0.66 | 0.18 | 0.82 | 0.72 | 0.81 |
| CORRECT ANSWER RATE | 0.85 | 0.58 | 0.77 | 0.73 | 0.48 | 0.27 | 0.73 | 0.91 | 0.86 |
| CORRECTED PHONEME SEQUENCE | k | i | i | b | o | NONE | o | d | o |

FIG. 10

|  | 1 | 2 | 3 | 4 | 5 | 6 | 7 | 8 |
|---|---|---|---|---|---|---|---|---|
| FIRST PHONEME SEQUENCE | m | e | m | o | o | r | i | i |
| GPP | 0.68 | 0.84 | 0.76 | 0.53 | 0.23 | 0.83 | 0.75 | 0.96 |
| CORRECT ANSWER RATE | 0.72 | 0.79 | 0.79 | 0.71 | 0.34 | 0.77 | 0.65 | 0.93 |
| SECOND PHONEME SEQUENCE | m | e | m | o | | | | |
| GPP | 0.59 | 0.69 | 0.65 | 0.82 | | | | |
| CORRECT ANSWER RATE | 0.65 | 0.61 | 0.70 | 0.86 | | | | |
| CORRECTED PHONEME SEQUENCE | m | e | m | o | NONE | r | i | i |

FIG. 11

| REQUEST PATTERN | INITIAL REQUEST PATTERN | korewa naninani desu to nobete kudasai (PLEASE SAY WHAT THIS IS.) |
|---|---|---|
| | CONFIRMATION REQUEST PATTERN | <…> deiidesuka (IT IS <…>, ISN'T IT?) |
| | CORRECTION REQUEST PATTERN | tadashikuwa naninani desu to nobete kudasai (PLEASE SAY WHAT IT SHOULD BE.) |
| RESPONSE PATTERN | AFFIRMATIVE PATTERN | hai (YES (POLITE)) |
| | | un (YES (FRANK)) |
| | | so (RIGHT) |
| | NEGATIVE PATTERN | iie (NO) |
| | | ee (IS IT?) |
| | | chigau (DIFFERENT) |
| | INITIAL RESPONSE PATTERN | korewa ≪…≫ desu (THIS IS ≪…≫.) |
| | CORRECTION RESPONSE PATTERN | tadashikuwa ≪…≫ desu (IT SHOULD BE ≪…≫.) |

FIG. 12

```
S: PLEASE SAY WHAT THIS IS.           … C1
U: THIS IS A DISPLAY.                 … C2
S: THIS IS A JISPLAY, ISN'T IT?       … C3
U: NO, IT ISN'T.                      … C4
S: PLEASE SAY WHAT THIS SHOULD BE.    … C5
U: "JIS" SHOULD BE "DIS".             … C6
S: THIS IS A DISPLAY, ISN'T IT?       … C7
U: YES, IT IS.                        … C8
```

SPEECH RECOGNITION APPARATUS, SPEECH RECOGNITION METHOD, AND SPEECH RECOGNITION ROBOT

CROSS REFERENCE TO RELATED APPLICATIONS

This application claims benefit from U.S. Provisional application Ser. No. 61/298,928, filed Jan. 28, 2010, the contents of which are incorporated herein by reference.

BACKGROUND OF THE INVENTION

1. Field of the Invention

The present invention relates to a speech recognition apparatus, a speech recognition method, and a speech recognition robot.

2. Description of Related Art

To use a robot in various environments, a technique of teaching a robot an unknown word through the use of a speech-dialogue with a user has been studied. However, when recognizing phonemes of an unknown word, a speech recognition apparatus according to the related art cannot exclude recognition errors completely. Accordingly, a technique of correcting a recognition error has been proposed. For example, a speech recognition apparatus described in JP-A-2006-146008 compares a word included in input speech with a word stored in advance, displays the recognition result on a screen, and selects a corrected word from the displayed recognition result according to a user's manual operation.

SUMMARY OF THE INVENTION

However, since the speech recognition apparatus described in JP-A-2006-146008 requires a screen displaying a recognition result or an input device receiving an operation input, it is not realistic that the speech recognition apparatus is applied to a robot.

The invention is made in consideration of the above-mentioned situation and provides a speech recognition apparatus, a speech recognition method, and a speech recognition robot, which can correct phonemes recognized using only speech from a user without using an input device at the time of registering an unregistered word.

To accomplish the above-mentioned goal, according to an aspect of the invention, there is provided (1) a speech recognition apparatus including: a speech input unit that receives input speech; a phoneme recognition unit that recognizes phonemes of the input speech and generates a first phoneme sequence representing corrected speech; a matching unit that matches the first phoneme sequence with a second phoneme sequence representing original speech; and a phoneme correcting unit that corrects phonemes of the second phoneme sequence based on the matching result.

(2) In the speech recognition apparatus, the phoneme correcting unit may correct the phonemes into phonemes selected based on the reliability for each phoneme in the phoneme sequences.

(3) In the speech recognition apparatus, the phoneme correcting unit may determine that there is a recognition error when a correct answer rate based on the reliability is lower than a predetermined value.

(4) In the speech recognition apparatus, the matching unit may calculate distances between the phonemes of the first phoneme sequence and the phonemes of the second phoneme sequence based on a frequency of each set of phoneme types recognized as the types of phonemes included in the input speech and may determine the matching result based on the distances.

(5) The speech recognition apparatus may further include: a speech reproducing unit that reproduces speech based on the corrected second phoneme sequence; a dialogue response pattern storage section that stores response patterns representing the recognition result; and a dialogue processing unit that performs one of a process of storing word information including the corrected second phoneme sequence in a word storage section and a process of causing the speech reproducing unit to reproduce speech urging a user to utter speech based on the response pattern matched with the phonemes of the input speech.

According to the configuration of (1), since the second phoneme sequence representing the original speech is corrected based on the matching result with the first phoneme sequence of the input speech which is the corrected speech uttered by a user, it is possible to correct the phoneme based on only the speech input from the user.

According to the configuration of (2), since the correction is made into the phonemes selected on the reliabilities of phonemes, it is possible to perform correction to the phonemes with the proven reliability.

According to the configuration of (3), it is determined that there is a recognition error when the correct answer rate of a phoneme is low. Accordingly, it is possible to avoid correcting a phoneme into a phoneme with a low correct answer rate.

According to the configuration of (4), since the matching result is determined based on the distances between the phonemes of the first phoneme sequence and the phonemes of the second phoneme sequences, which is calculated based on the probability for each phoneme type recognized as a phoneme, it is possible to embody the matching in consideration of the recognition error.

According to the configuration of (5), speech representing the corrected phoneme sequence is reproduced and word information including the corrected phoneme sequence is stored or speech urging a user to utter speech is reproduced based on input speech representing a response from a user. Accordingly, since the user is urged to respond to the corrected phoneme sequence based on speech and the word information including the phoneme sequence corrected by the response is registered or the user is urged to utter speech again, it is possible to smoothly correct the phoneme recognition error using only speech.

BRIEF DESCRIPTION OF THE DRAWINGS

FIG. 5 is a diagram illustrating an example of confusion matrix information according to the first embodiment.

FIG. 6 is a diagram illustrating an example of the matching result of a first phoneme sequence and a second phoneme sequence according to the first embodiment.

FIG. 7 is a diagram illustrating another example of the matching result of the first phoneme sequence and the second phoneme sequence according to the first embodiment.

FIG. 8 is a diagram illustrating an example of the GPP for each phoneme included in phoneme sequences and the correct answer rate in the first embodiment.

FIG. 9 is a diagram illustrating another example of the GPP for each phoneme included in the phoneme sequences and the correct answer rate in the first embodiment.

FIG. 10 is a diagram illustrating another example of the GPP for each phoneme included in the phoneme sequences and the correct answer rate in the first embodiment.

FIG. 11 is a diagram illustrating an example of pattern information in the first embodiment.

FIG. 12 is a diagram illustrating an example of a dialogue between a user and the speech recognition apparatus according to the first embodiment.

DETAILED DESCRIPTION OF THE INVENTION

First Embodiment

Figure 1:
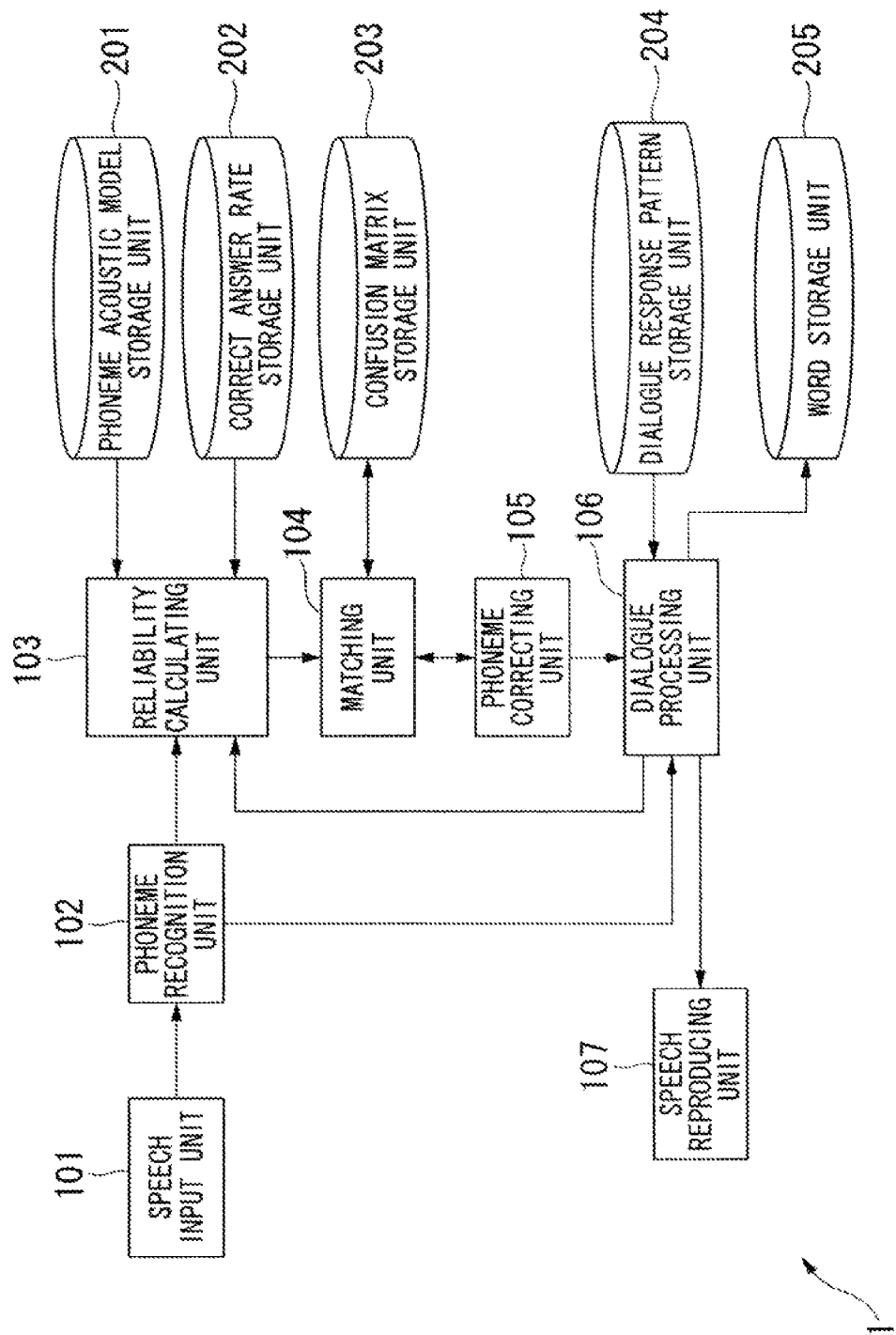
FIG. 1 is a diagram schematically illustrating the configuration of a speech recognition apparatus according to a first embodiment of the invention.

Hereinafter, embodiments of the invention will be described in detail with reference to the accompanying drawings. FIG. 1 is a diagram schematically illustrating the configuration of a speech recognition apparatus 1 according to a first embodiment of the invention. The speech recognition apparatus 1 includes a speech input unit 101, a phoneme recognition unit 102, a reliability calculating unit 103, a matching unit 104, a phoneme correcting unit 105, a dialogue processing unit 106, a speech reproducing unit 107, a phoneme acoustic model storage section 201, a correct answer rate storage section 202, a configuration matrix storage section 203, a dialogue response pattern storage section 204, and a word storage section 205.

The speech input unit 101 converts vibration in air due to speech uttered by a user into a speech signal and outputs the speech signal to the phoneme recognition unit 102. The speech input unit 101 is, for example, a microphone receiving sound waves of a frequency band (for example, 200 Hz to 4 kHz) of speech uttered by a user.

The phoneme recognition unit 102 converts the analog speech signal input from the speech input unit 101 into a digital speech signal. Here, the phoneme recognition unit 102 converts the input analog signal into a quantized signal sample, for example, by performing a pulse code modulation (PCM) on binary data with a sampling frequency of 16 kHz and an amplitude of 16 bits. The phoneme recognition unit 102 calculates a speech feature quantity from the digital speech signal. The speech feature quantity is, for example, a 25-dimensional Mel-frequency coefficient (MFCC).

The phoneme recognition unit 102 recognizes phonemes representing the user's pronunciation using a known phoneme recognition method based on the calculated speech feature quantity and generates a phoneme sequence including the recognized phonemes. The phoneme recognition unit 102 can recognize the phonemes, for example, using a hidden Markov model (HMM), but may employ other methods. A phoneme means a basic unit of speech in a language which a speaker can recognize as the same. In the first embodiment of the invention, a phoneme is synonymous with a phonological element. The phoneme recognition unit 102 outputs the generated phoneme sequence and a speech feature vector which is time-series data of the calculated speech feature quantity to the reliability calculating unit 103 and the dialogue processing unit 106.

The reliability calculating unit 103 calculates the reliability for each phoneme based on the phoneme sequence and the speech feature vector input from the phoneme recognition unit 102 or the dialogue processing unit 106. The reliability is a variable representing the reliability of the recognition result of a phoneme. The reliability calculating unit 103 calculates, for example, a generalized posterior probability (GPP) and a correct answer rate as the reliability, but may calculate other variables.

For example, when a speech feature vector $x_1$ is given, the reliability calculating unit 103 calculates the GPPs of phonemes u continuous from a start time s to an end time t using Expression 1 (see Lijuan Wang et. al; "Phonetic Transcription Verification with Generalized Posterior Probability,", 'Interspeech 2005', 2005, p. 1950).

$$P([u;s,t] \mid x_1^T) = \sum_{\substack{M, [u;s,t]_1^M \\ \exists n, 1 \le n \le M \\ u = u_n \\ |s_n - s| \le \Delta, |t_n - t| \le \Delta}} \frac{\prod_{m=1}^{M} p^{\alpha}(x_{s_m}^{t_m} \mid u_m)}{p(x_1^T)} \quad \text{Expression 1}$$

In Expression 1, T represents a transpose of a vector. M represents the number of phonemes in a path in a phoneme graph. Here, m and n are indexes representing phonemes in the path and α represents an exponential weight for an acoustic model. $P(x_1^T)$ represents the probability of the speech feature vector $x_1$. $P(x_{sm}^{tm} \mid u_m)$ represents a conditional probability of a corresponding part of phoneme $u_m$, that is, a speech feature vector $x_{sm}^{tm}$ with a start time of $s_m$ and an end time of $t_m$.

The phoneme acoustic model storage section 201 stores the probability $P(x_1^T)$ of the speech feature vector $x_1$ and the conditional probability $P(x_{sm}^{tm} \mid u_m)$ of the speech feature vector $x_{sm}^{tm}$ of a phoneme $u_m$ in advance. The reliability calculating unit 103 reads the probability $P(x_1^T)$ corresponding to the speech feature vector $x_1$ input from the phoneme recognition unit 102 and the conditional probability $P(x_{sm}^{tm} \mid u_m)$ of the speech feature vector $x_{sm}^{tm}$ of a phoneme $u_m$ from the phoneme acoustic model storage section 201 and calculates the GPPs using Expression 1.

Figure 2:
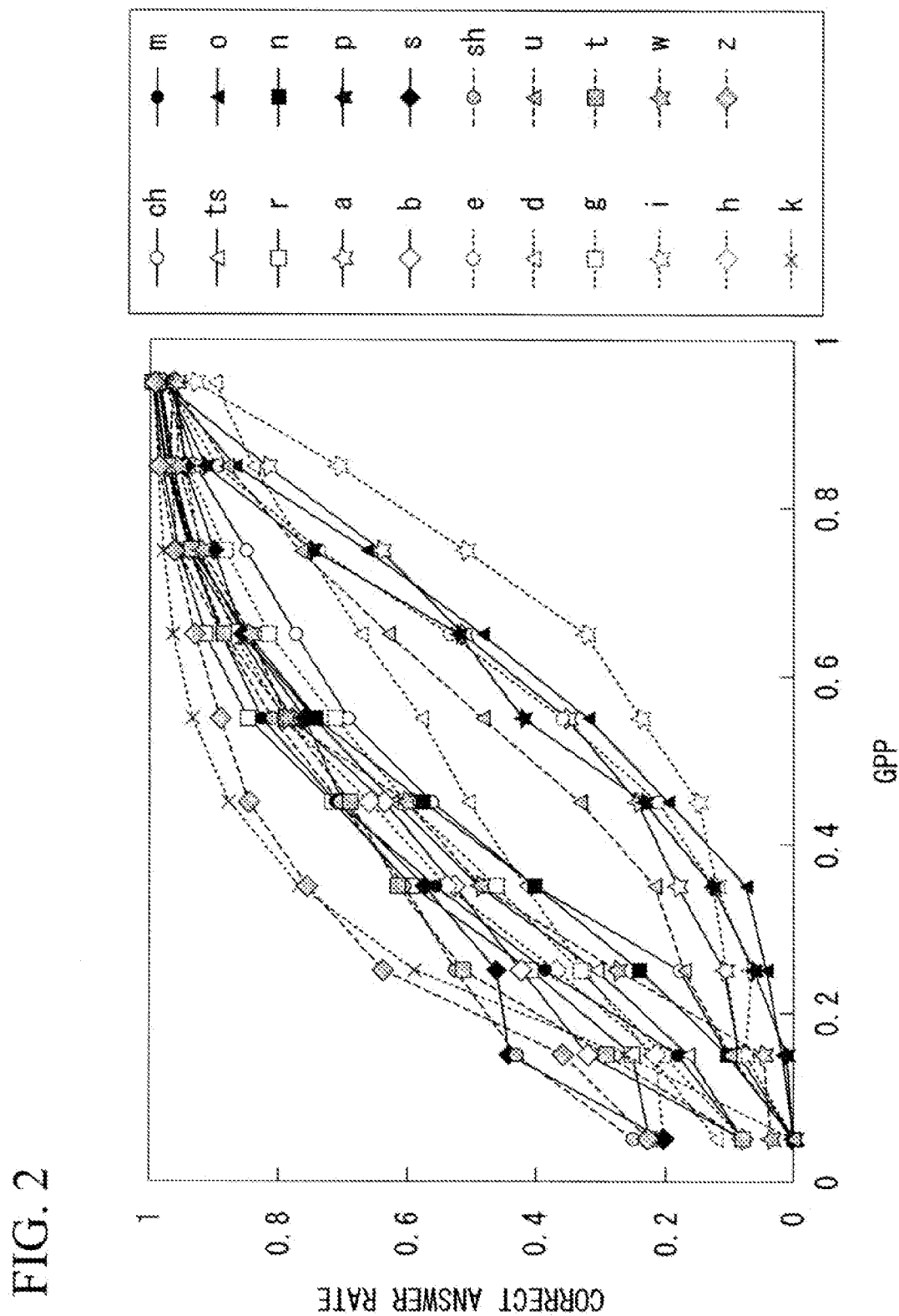
FIG. 2 is a diagram illustrating a relationship between a GPP and a correct answer rate for each type of phoneme according to the first embodiment.

The reliability calculating unit 103 determines a correct answer rate based on the GPP calculated for each phoneme. The correct answer rate is the probability that a correct phoneme can be obtained as the recognition result of the phoneme recognition unit 102. Specifically, the relationship between the GPP for each phoneme included in the phoneme sequences and the correct answer rate is stored in the correct answer rate storage section 202. Accordingly, the reliability calculating unit 103 reads and determines the correct answer rate corresponding to the GPP calculated for each phoneme from the correct answer rate storage section 202. Examples of the relationship between the GPP and the correct answer rate for each type of phoneme constituting pronunciations in Japanese are shown in FIG. 2. In FIG. 2, the horizontal axis represents the GPP and the vertical axis represents the correct answer rate. The lines represent the correct answer rates with respect to the GPPs for the phonemes. FIG. 2 shows that the correct answer rate increases as the GPP of any phoneme increases. The minimum values of the GPP and the correct answer rate are both zero and the maximum values are both 1. However, the correct answer rate or the increasing rate thereof is not constant depending on the types of phonemes. The reliability calculating unit 103 outputs a phoneme sequence and the correct answer rate (or the GPP) of each phoneme constituting the phoneme sequence to the matching unit 104.

The matching unit 104 newly receives a phoneme sequence (hereinafter, referred to as a "first phoneme sequence") and the correct answer rates (or the GPP) of phonemes constituting the phoneme sequence from the reliability calculating unit 103. The matching unit 104 receives and stores a phoneme sequence (hereinafter, referred to as a "second phoneme sequence") previously input or corrected and the correct answer rates (or the GPP) of phonemes constituting the second phoneme sequence from the phoneme correcting unit 105. The matching unit 104 performs a matching (combination) process on the first phoneme sequence and the second phoneme sequence. The matching unit 104 uses, for example, an endpoint free DP matching method (which is also referred to as a both-endpoint free DP method or a level building method) for the matching process, but may employ other methods.

Figure 3:
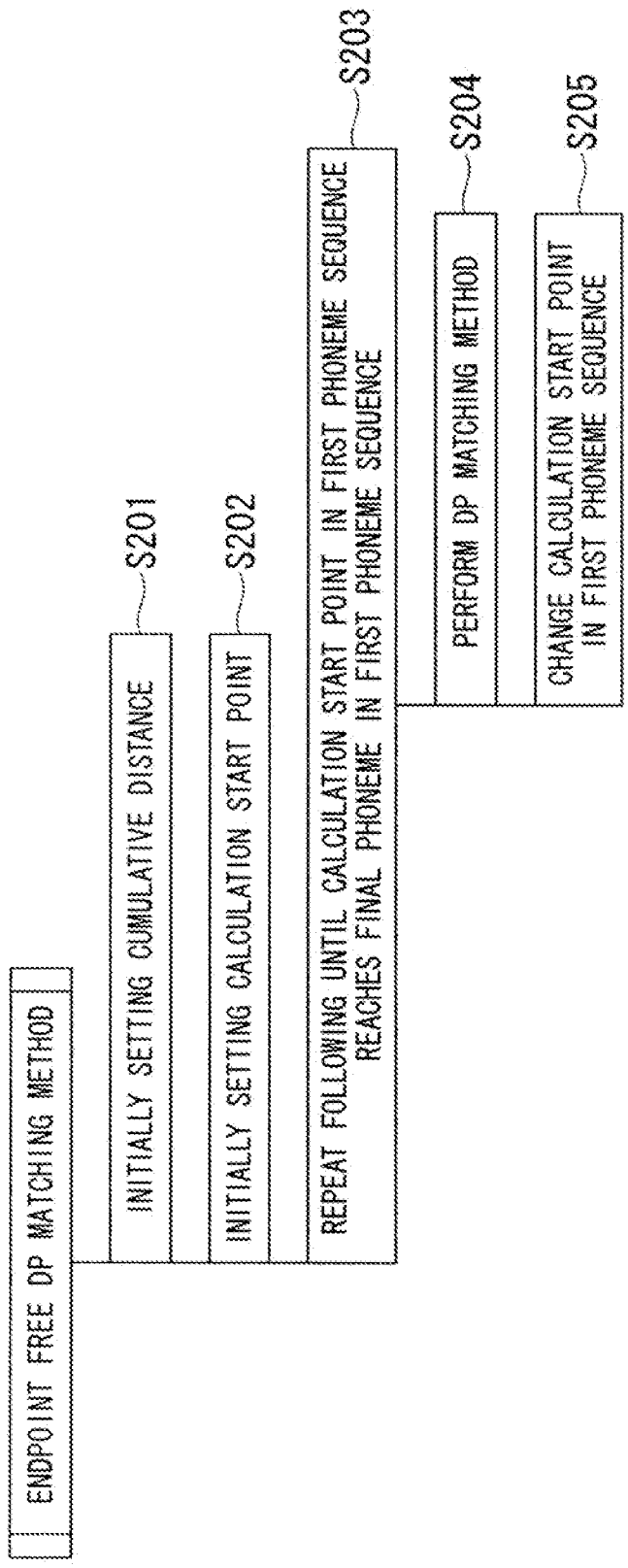
FIG. 3 is a flow diagram illustrating the flow of an endpoint free DP matching method.

The processes of the endpoint free DP matching method will be described with reference to FIG. 3. FIG. 3 is a flow diagram illustrating the flow of the endpoint free DP matching method.

In step S201, the matching unit 104 initially sets a cumulative distance to zero.

In step S202, the matching unit 104 initially sets the first phoneme in the first phoneme sequence and one of the phonemes in the second phoneme sequence as first phonemes (hereinafter, referred to as "calculation start point") of the phonemes from which a distance should be calculated and which will be described later.

In step S203, the matching unit 104 repeatedly performs the processes of steps S204 and S205 until the calculation start point for the first phoneme sequence reaches the final phoneme in the first phoneme sequence.

In step S204, the matching unit 104 performs the DP matching method (in which the start point and the end point are fixed).

In step S205, the matching unit 104 shifts the calculation start point for the first phoneme sequence to the next phoneme.

The matching unit 104 performs the above-mentioned processes on all the phonemes in the second phoneme sequence which are the calculation start points and calculates the cumulative distance for each case. The matching unit 104 determines the calculation start point minimizing the calculated cumulative distance, that is, the correspondence relationship between the first phoneme sequence and the second phoneme sequence as the matching result. That is, the matching result is matching information including pairs of a phoneme in the first phoneme sequence and a phoneme in the second phoneme sequence.

Figure 4:
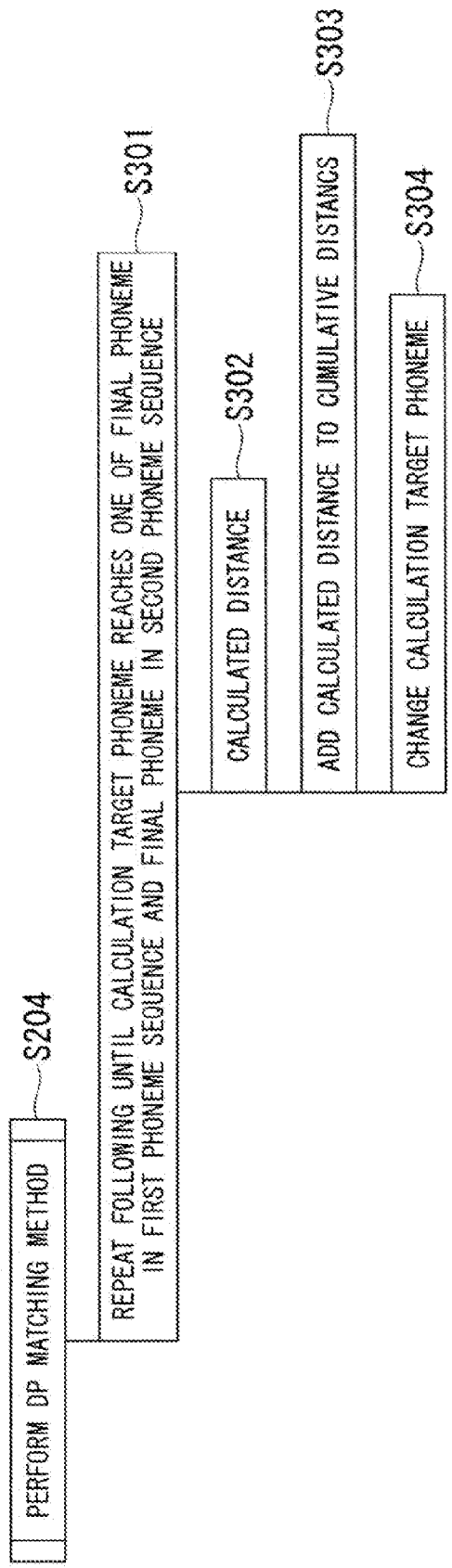
FIG. 4 is a flow diagram illustrating a DP matching method.

The processes of the DP matching method performed in step S204 will be described below with reference to FIG. 4. FIG. 4 is a flow diagram illustrating the flow of the DP matching method.

In step S301, the matching unit 104 repeatedly performs the processes of steps S302 to S304 until the phonemes (calculation target phoneme) from which a distance should be calculated reach one of the final phoneme in the first phoneme sequence and the final phoneme in the second phoneme sequence.

In step S302, the matching unit 104 calculates a distance between the calculation target phonemes as described later.

In step S305, the matching unit 104 adds the calculated distance to the cumulative distance.

In step S306, the matching unit 104 changes the calculation target phonemes to the next phonemes in the first phoneme sequence and the second phoneme sequence.

In the matching process, the matching unit 104 calculates the distance using an input error as a kind of phoneme in consideration of a case where a phoneme in the input speech does not exist in part of the first phoneme sequence (input error). Similarly, the matching unit 104 calculates the distance using a missing error as a kind of phoneme as described later in consideration of a case where a phoneme as a recognition result does not exist in part of the second phoneme sequence.

The matching unit 104 calculates the distance $d(\alpha,\beta)$ between a phoneme a in the first phoneme sequence and a phoneme $\beta$ in the second phoneme sequence, which are the calculation target phonemes, for example, using Expression 2 in step S302.

$$d(\alpha,\beta) = -\log P(\alpha,\beta) \quad \text{Expression 2}$$

In Expression 2, $P(\alpha, \beta)$ represents the probability that the phoneme in the input speech (hereinafter, referred to as an "input phoneme") corresponding to the phoneme $\alpha$ as the recognition result (hereinafter, referred to as a "recognized phoneme") is equal to the input phoneme of the recognized phoneme $\beta$. When a possible phoneme as the input phoneme is $\gamma$, $P(\alpha, \beta)$ is expressed by Expression 3.

$$P(\alpha, \beta) = \sum_{\gamma} P(\alpha | \gamma) P(\beta | \gamma) P(\gamma) \quad \text{Expression 3}$$

In Expression 3, $P(\alpha|\gamma)$ represents the probability that the input phoneme $\gamma$ is recognized as the recognized phoneme $\alpha$. $P(\beta|\gamma)$ represents the probability that the input phoneme $\gamma$ is recognized as the recognized phoneme $\beta$. $P(\gamma)$ represents the probability that the input phoneme $\gamma$ appears.

The confusion matrix storage section 203 stores confusion matrix information having as elements frequencies at which the input phoneme $\gamma$ is recognized as the recognized phoneme a in advance. The matching unit 104 reads the frequency at which the input phoneme is recognized as the recognized phoneme $\alpha$ and the frequency at which the input phoneme is recognized as the recognized phoneme $\beta$ from the confusion matrix information stored in the confusion matrix storage section 203 and calculates the probabilities $P(\alpha|\gamma)$, $P(\beta|\gamma)$, and $P(\gamma)$. The matching unit 104 calculates $P(\alpha, \beta)$ by the use of Expression 3 and calculated $d(\alpha, \beta)$ by the use of Expression 2.

An example of the confusion matrix information is shown in FIG. 5. FIG. 5 is a diagram illustrating an example of the confusion matrix information according to the first embodiment. In FIG. 5, the row represents zh, $\phi$, ng, a, and b as the input phoneme $\gamma$. The column represents zh, $\phi$, ng, a, and b as the recognized phoneme $\alpha$. The numerical values represent the frequency for each set of the recognized phoneme $\alpha$ and the input phoneme $\gamma$. For example, when the input phoneme $\gamma$ is zh and the recognized phoneme $\alpha$ is recognized as zh, the frequency is 7072. Here, the frequencies are shown when the row and the column of the confusion matrix are equal to each other, that is, when the input phoneme $\gamma$ and the recognized phoneme $\alpha$ are equal to each other (when the recognized result is correct) and when the row and the column of the confusion matrix are different from each other, that is, when the input phoneme γ and the recognized phoneme α are different from each other (when the recognition result is not correct). In the example shown in FIG. 5, the number of cases where the recognition result is correct is greater than the number of cases where the recognition result is not correct. In consideration of Expression 2, the distance when the input phoneme γ and the recognized phoneme α are equal to each other is greater than that when they are different from each other. When the input phoneme γ is φ, it means an input error where the corresponding input phoneme does not exist. When the recognized phoneme α is φ, it means a missing error where the corresponding recognized phoneme does not exist.

FIG. 6 is a diagram illustrating an example of the matching result of the first phoneme sequence and the second phoneme sequence. In the example shown in FIG. 6, the first phoneme sequence is "disu" and the second phoneme sequence is "jisupurei". Here, the first phoneme sequence "disu" corresponds to the part of "jisu" of the second phoneme sequence.

FIG. 7 is a diagram illustrating another example of the matching result of the first phoneme sequence and the second phoneme sequence. In the example shown in FIG. 7, the first phoneme sequence is "boodo" and the second phoneme sequence is "kiibonono". Here, the part of "bo" of the first phoneme sequence corresponds to the part "bo" of the second phoneme sequence. The part of "odo" of the first phoneme sequence corresponds to the part of "ono" of the second phoneme sequence. The phoneme of the first phoneme sequence corresponding to the sixth phoneme "n" of the second phoneme sequence does not exist.

As described above with reference to FIGS. 6 and 7, the number of phonemes may be different between the phoneme sequences. However, the matching unit 104 performs the matching process so that a phoneme midway into one phoneme sequence corresponds to a start point of the other phoneme sequence, like the endpoint free DP matching method. As a result, in this case, it is possible to determine the matching information between the phoneme sequences.

Therefore, when a user responds based on speech representing the first phoneme sequence so as to correct the second phoneme sequence as the recognition result, the user may respond based on only the part corresponding to the recognition error in the second phoneme sequence.

As shown in FIG. 7, one part and another part in one phoneme sequence may be separated. However, the matching unit 104 can determine the matching information between the phoneme sequences by considering an input error or a missing error.

Referring to FIG. 1 again, the matching unit 104 outputs the first phoneme sequence, the second phoneme sequence, the matching information, and the correct answer rates of the phonemes included in the phoneme sequences to the phoneme correcting unit 105.

The phoneme correcting unit 105 receives the first phoneme sequence, the second phoneme sequence, the matching information, and the correct answer rates of the phonemes included in the phoneme sequences from the matching unit 104. The phoneme correcting unit 105 correlates the phonemes included in the input first phoneme sequence with the phonemes included in the input second phoneme sequence with reference to the matching information and stores the correlated phonemes in its own memory area.

FIG. 8 is a diagram illustrating an example of the GPP for each phoneme included in the phoneme sequences and the correct answer rate thereof in the first embodiment. FIG. 8 shows the first phoneme sequence, the GPP for each phoneme included in the first phoneme sequence, the correct answer rate, the second phoneme sequence, the GPP for each phoneme included in the second phoneme sequence, the correct answer rate, and the corrected phoneme sequence having been subjected to the later-described processes. Referring to FIG. 8, the GPPs corresponding to the phonemes "d", "i", "s", and "u" included in the first phoneme sequence are 0.75, 0.73, 0.48, and 0.76, respectively and the correct answer rates thereof are 0.92, 0.80, 0.73, and 0.78. The GPPs corresponding to the phonemes "j", "i", "s", "u", "p", "u", "r", "e", and "i" included in the second phoneme sequence are 0.21, 0.62, 0.53, 0.92, 0.44, 0.91, 0.54, 0.66, and 0.88, respectively and the correct answer rates thereof are 0.06, 0.52, 0.75, 0.96, 0.28, 0.94, 0.85, 0.50, and 0.85. The corrected phoneme sequence is "disupurei". Numerical values 1 to 9 shown in the upper part of the table of FIG. 8 are indexes indicating the order of phonemes.

FIG. 9 is a diagram illustrating another example of the GPP for each phoneme included in the phoneme sequences and the correct answer rate thereof in the first embodiment. FIG. 9 shows the first phoneme sequence, the GPP for each phoneme included in the first phoneme sequence, the correct answer rate, the second phoneme sequence, the GPP for each phoneme included in the second phoneme sequence, the correct answer rate, and the corrected phoneme sequence having been subjected to the later-described processes. Referring to FIG. 9, the GPPs corresponding to the phonemes "b", "o", "o", "d", and "o" included in the first phoneme sequence are 0.53, 0.52, 0.78, 0.73, and 0.79, respectively and the correct answer rates thereof are 0.74, 0.24, 0.67, 0.91, and 0.82. The GPPs corresponding to the phonemes "k", "i", "i", "b", "o", "n", "o", "n", and "o" included in the second phoneme sequence are 0.43, 0.63, 0.62, 0.54, 0.66, 0.18, 0.82, 0.72, and 0.81, respectively and the correct answer rates thereof are 0.85, 0.58, 0.77, 0.73, 0.48, 0.27, 0.73, 0.91, and 0.86. The corrected phoneme sequence is "kiiboodo" (keyboard). Numerical values 1 to 9 shown in the upper part of the table of FIG. 9 are indexes indicating the order of phonemes.

FIG. 10 is a diagram illustrating another example of the GPP for each phoneme included in the phoneme sequences and the correct answer rate thereof in the first embodiment. FIG. 10 shows the first phoneme sequence, the GPP for each phoneme included in the first phoneme sequence, the correct answer rate, the second phoneme sequence, the GPP for each phoneme included in the second phoneme sequence, the correct answer rate, and the corrected phoneme sequence having been subjected to the later-described processes. Referring to FIG. 10, the GPPs corresponding to the phonemes "m", "e", "m", "o", "o", "r", "1", and "i" included in the first phoneme sequence are 0.68, 0.84, 0.76, 0.53, 0.23, 0.83, 0.75, and 0.96, respectively and the correct answer rates thereof are 0.72, 0.79, 0.79, 0.71, 0.34, 0.77, 0.65, and 0.93. The GPPs corresponding to the phonemes "m", "e", "m", and "o" included in the second phoneme sequence are 0.59, 0.69, 0.65, and 0.82, respectively and the correct answer rates thereof are 0.65, 0.61, 0.70, and 0.86. The corrected phoneme sequence is "memorii" (memory). Numerical values 1 to 8 shown in the upper part of the table of FIG. 10 are indexes indicating the order of phonemes.

The phoneme correcting unit 105 corrects the input second phoneme sequence based on the first phoneme sequence, the matching information, and the correct answer rates and determines the corrected phoneme sequence.

Here, when a phoneme included in the first phoneme sequence is different from the corresponding phoneme included in the second phoneme sequence, the phoneme correcting unit 105 determines the phoneme having the higher correct answer rate out of the phonemes as the phoneme included in the corrected phoneme sequence.

For example, in FIG. 8, the first phoneme "j" of the second phoneme sequence is different from the corresponding phoneme "d" of the first phoneme sequence. Since the correct answer rate corresponding to the phoneme "d" is 0.92 which is higher than the correct answer rate 0.06 corresponding to the phoneme "j", the phoneme correcting unit 105 determines the first phoneme of the corrected phoneme sequence as "d".

When a phoneme included in the first phoneme sequence is equal to the corresponding phoneme included in the second phoneme sequence, the phoneme correcting unit 105 determines the phoneme as a phoneme included in the corrected phoneme sequence. When the phoneme included in the first phoneme sequence corresponding to a phoneme included in the second phoneme sequence does not exist, the phoneme correcting unit 105 determines the phoneme included in the second phoneme sequence as the phoneme included in the corrected phoneme. However, when the correct answer rate corresponding to a phoneme included in the second phoneme sequence is smaller than a predetermined value (for example, 0.5), the phoneme correcting unit 105 does not add the phoneme to the corrected phoneme sequence but excludes the phoneme. For example, in FIG. 9, since the correct answer rate corresponding to the sixth phoneme "n" of the second phoneme sequence is 0.27 which is smaller than the predetermined value 0.5, the phoneme correcting unit does not add the phoneme "n" to the corrected phoneme sequence but excludes the phoneme.

When the phoneme corresponding to a phoneme included in the first phoneme sequence does not exist in the second phoneme sequence, the phoneme correcting unit 105 adds the corresponding phoneme of the first phoneme sequence to the corrected phoneme sequence.

However, when the correct answer rate corresponding to the phoneme included in the first phoneme sequence is smaller than a predetermined value, the phoneme correcting unit 105 does not add the phoneme to the corrected phoneme sequence but excludes the phoneme. For example, in FIG. 10, since the correct answer rate corresponding to the fifth phoneme "o" of the first phoneme sequence is 0.34 which is smaller than the predetermined value 0.5, the phoneme correcting unit does not add the phoneme "o" to the corrected phoneme sequence but excludes the phoneme.

When determining the corrected phoneme sequence corresponding to the second phoneme sequence, the phoneme correcting unit 105 outputs the determined corrected phoneme sequence and the correct answer rates of the phonemes included in the corrected phoneme sequence to the matching unit 104. The matching unit 104 sets the corrected phoneme sequence as a new second phoneme sequence. The phoneme correcting unit 105 outputs the corrected phoneme sequence (second phoneme sequence) to the dialogue processing unit 106.

The first embodiment of the invention is not limited to the configuration in which the phoneme correcting unit 105 determines the corrected phoneme sequence based on the correct answer rates of the phonemes included in the phoneme sequences as described above. The phoneme correcting unit 105 may receive the GPPs of the phonemes included in the phoneme sequences instead of the correct answer rates and may determined the corrected phoneme sequence based on the GPPs of the phonemes. Here, when the GPP of a phoneme is smaller than a predetermined threshold value, the phoneme correcting unit 105 excludes the phoneme from the corrected phoneme sequence. The threshold value is, for example, a value corresponding to a constant correct answer rate without depending on the types of phonemes. In this case, since the relationship between the GPP and the correct answer rate varies depending on the types of phonemes (see FIG. 2), the threshold value also varies depending on the types of the phonemes. The phoneme correcting unit 105 outputs the GPPs of the phonemes included in the corrected phoneme sequence to the matching unit 104 instead of the correct answer rates.

The dialogue response pattern storage section 204 stores pattern information shown, for example, in FIG. 11 in advance. FIG. 11 is a diagram illustrating an example of the pattern information in the first embodiment. The pattern information includes a request pattern and a response pattern. The request pattern includes an initial request pattern, a confirmation request pattern, and a correction request pattern. The response pattern includes an affirmative pattern, a negative pattern, an initial response pattern, and a correction response pattern. Details of the patterns will be described later.

Referring to FIG. 1 again, in order to receive a phoneme sequence in speech to be recognized from a user, the dialogue processing unit 106 first reads dialogue pattern information (initial request pattern) for requesting a user to utter the phoneme sequence from the dialogue response pattern storage section 204. That is, the initial request pattern is information including a phoneme sequence representing a pattern of a message proposed by the speech recognition apparatus 1 and urges the user to utter the phoneme sequence to be recognized. The initial request pattern is, for example, "korewa naninani desu to nobetekudasai" (please say what this is) shown in FIG. 11. This example is a phoneme sequence for urging a user to utter "korewa<< . . . >>desu" (this is << . . . >>) and, for example, a phoneme sequence representing a noun is included in the part of "<< . . . >>". The dialogue processing unit 106 outputs the initial request pattern as an initial request phoneme sequence to the speech reproducing unit 107.

When a phoneme sequence is input from the phoneme recognition unit 102, the dialogue processing unit 106 reads dialogue pattern information (confirmation request pattern) for requesting the user to confirm the phoneme sequence as the recognition result from the dialogue response pattern storage section 204. That is, the confirmation request pattern is information including a phoneme sequence representing a pattern of a message proposed by the speech recognition unit 1 and urges the user to orally respond to the recognition result of the phoneme sequence which is corrected based on the user's response. The confirmation request pattern is, for example, "< . . . >deiidesuka" (this is < . . . >, isn't it?) shown in FIG. 11. The part "< . . . >" represents a part into which the corrected phoneme sequence is inserted.

The dialogue processing unit 106 inserts the corrected phoneme sequence into the confirmation request pattern and generates a phoneme sequence (confirmation request phoneme sequence) representing a message for requesting the user to confirm the recognition result. That is, the confirmation request phoneme sequence is a phoneme sequence representing the message for urging the user to orally respond to the inserted phoneme sequence. For example, when the corrected phoneme sequence is "disupurei" (display), the confirmation request phoneme sequence is a phoneme sequence "disupurei deiidesuka" representing "this is display, isn't it?". The dialogue processing unit 106 outputs the confirmation request phoneme sequence to the speech reproducing unit 107.

The dialogue processing unit 106 performs the process to be described later to determine whether the phoneme sequence input from the phoneme recognition unit 102 is a phoneme sequence representing that the corrected phoneme sequence is not correct as the recognition result. When it is determined that the phoneme sequence input from the phoneme recognition unit 102 is a phoneme sequence representing that the corrected phoneme sequence is not correct as the recognition result, the dialogue processing unit 106 reads dialogue pattern information (correction request pattern) for requesting the user to utter a correct phoneme sequence from the dialogue response pattern storage section 204. The correction request pattern is, for example, "tadashikuwa naninani desu to nobetekudasai" (please say what it should be) shown in FIG. 11. This example is a phoneme sequence for urging the user to utter "tadashikuwa<< . . . >>desu" (it should be << . . . >>) and a correct phoneme sequence is included in the part of "<< . . . >>". The dialogue processing unit 106 outputs the correction request pattern as a correction request phoneme sequence to the speech reproducing unit 107.

A phoneme sequence and a speech feature vector are input to the dialogue processing unit 106 from the phoneme recognition unit 102. The dialogue processing unit 106 reads response pattern information (response pattern) representing the type of the user's oral response from the dialogue response pattern storage section 204 based on the input phoneme sequence. The response pattern includes a phoneme sequence (affirmative pattern) representing that the corrected phoneme sequence is correct as the recognition result, such as "hai", "un", and "so" shown in FIG. 11 and a phoneme sequence (negative pattern) representing that the corrected phoneme sequence is incorrect as the recognition result, such as "iie", "ee", and "chigau" shown in FIG. 11. The response pattern also includes a phoneme sequence (initial response pattern) representing a pattern of a message first returned as a recognition target by the user and a phoneme sequence (correction response pattern) representing a pattern of a message including a phoneme sequence returned as a recognition result by the user.

The initial response pattern is, for example, "korewa << . . . >>desu" (this is << . . . >>) shown in FIG. 11. The part other than << . . . >> is equal to the part of the initial request pattern other than the part including the phoneme sequence "naninani" as a return and the part representing an instruction to the user, "to nobetekudasai" (please say that . . . ). That is, the initial request pattern and the initial response pattern commonly include the part representing a pattern requested to the user as the initial response.

The correction response pattern is, for example, "tadashikuwa<< . . . >>desu" (it should be << . . . >>) shown in FIG. 11. The part other than << . . . >> is equal to the part of the correction request pattern other than the part including the phoneme sequence "naninani" as a return and the part representing an instruction to the user, "to nobetekudasai" (please say that . . . ). That is, the correction request pattern and the correction response pattern commonly include the part representing a pattern requested to the user as the correction response.

The part << . . . >> means a part including a phoneme sequence to be recognized as a response.

Referring to FIG. 1, the dialogue processing unit 106 performs the matching process on the phoneme sequence input from the phoneme recognition unit 102 and the response pattern information read from the dialogue response pattern storage section 204 to determine a response pattern that most closely matches with the input phoneme sequence. In the matching process, the dialogue processing unit 106 performs, for example, the endpoint free DP matching method.

When the determined response pattern information is one of the affirmative patterns, the dialogue processing unit 106 stores the corrected phoneme sequence corrected based on the user's response as word information in the word storage section 205. That is, the dialogue processing unit 106 recognizes that the phoneme sequence input from the phoneme recognition unit 102 is a phoneme sequence representing that the corrected phoneme sequence is the correct recognition result. Accordingly, the speech recognition apparatus 1 can use the newly-stored phoneme sequence as a word to be recognized.

When the determined response pattern information is one of the negative patterns, the dialogue processing unit 106 recognizes that the phoneme sequence input from the phoneme recognition unit 102 is a phoneme sequence representing that the corrected phoneme sequence is an incorrect recognition result. At this time, the dialogue processing unit 106 reads the correction request pattern from the dialogue response pattern storage section 204 as described above.

When the determined response pattern information is the initial response pattern or the correction response pattern, the dialogue processing unit 106 recognizes that the phoneme sequence input from the phoneme recognition unit 102 is a phoneme sequence including a phoneme sequence to be recognized. At this time, the dialogue processing unit 106 extracts the part, which corresponds to << . . . >> of the initial response pattern or the correction response pattern, of the phoneme sequence input from the phoneme recognition unit 102 and sets the extracted part as a new first phoneme sequence. The dialogue processing unit 106 extracts a speech feature vector corresponding to the extracted first phoneme sequence from speech feature vector input from the phoneme recognition unit 102. The dialogue processing unit 106 outputs the extracted first phoneme sequence and the extracted speech feature vector to the reliability calculating unit 103.

The speech reproducing unit 107 generates a speech signal from the initial request phoneme sequence, the correction request phoneme sequence, or the confirmation request phoneme sequence input from the dialogue processing unit 106 using a known text-speech synthesizing method. The speech reproducing unit 107 reproduces speech based on the generated speech signal. The speech reproducing unit 107 reproduces speech including, for example, a message "disupurei deiidesuka" representing "it is display, isn't it?" based on the confirmation request phoneme sequence. Accordingly, the user can be urged to utter speech on whether the corrected phoneme sequence "disupurei" is correct as the recognition result.

The speech reproducing unit 107 reproduces speech including, for example, a message "korewa naninani desu" representing "please say what thus is" based on the initial request phoneme sequence. Accordingly, the user can be urged to utter a phoneme sequence to first be recognized as the part << . . . >> of "korewa<< . . . >>desu" (this is << . . . >>).

The speech reproducing unit 107 reproduces speech including, for example, a message "tadashikuwa naninani desu" representing "it should be . . . " based on the correction request phoneme sequence. Accordingly, the user can be urged to utter a phoneme sequence as the part << . . . >> of "tadashikuwa<< . . . >>desu" (it should be >> . . . <<).

A speech recognition process performed by the speech recognition apparatus 1 will be described below. The speech recognition apparatus 1 can orally communicate with a user using the dialogue shown in FIG. 12 and store a new word, by performing the speech recognition process.

FIG. 12 is a diagram illustrating an example of a dialogue between the speech recognition apparatus 1 according to the first embodiment and the user. In FIG. 12, reference symbol S represents details of speech reproduced by the speech recognition apparatus 1. Reference symbol U represents details of speech uttered by the user. Reference symbols C1 to C8 represent the order of speech.

Reference symbol C1 represents that the speech recognition apparatus 1 reproduces speech based on an initial request phoneme sequence of "korewa naninani desu to nobete kudasai" meaning "please say what this is". Accordingly, the speech recognition apparatus 1 requests the user to orally return a phoneme sequence based on the initial response pattern of "korewa<< . . . >>desu" (this is << . . . >>).

Reference symbol C2 represents that the user returns speech of "this is display". Accordingly, the user orally returns a phoneme sequence of "disupurei" meaning "display" based on the initial response pattern requested for in C1.

Reference symbol C3 represents that the speech recognition apparatus 1 reproduces speech based on a confirmation request phoneme sequence of "jisupurei deiidesuka" meaning "this is jisupurei, isn't it?". Accordingly, the speech recognition apparatus 1 requests the user to orally return whether the recognized phoneme sequence "jisupurei" is correct as the recognition result.

Reference symbol C4 represents that the user returns speech of "no". Accordingly, the user orally returns a negative pattern of "iie" (no) representing that the recognition result in C3 is incorrect.

Reference symbol C5 represents that the speech recognition apparatus 1 reproduces speech based on a correction request phoneme sequence of "tadashikuwa naninani desu to nobete kudasai" meaning "please say what it should be". Accordingly, the speech recognition apparatus 1 requests the user to orally return a phoneme sequence based on the first correction response pattern of "tadashikuwa<< . . . >>desu" (it should be << . . . >>).

Reference symbol C6 represents that the user returns speech of "it should be dis". Accordingly, the user orally returns a phoneme sequence of "disu" corresponding to the part "jisu" incorrectly recognized by the speech recognition apparatus 1 based on the correction response pattern requested for in C5.

Reference symbol C7 represents that the speech recognition apparatus 1 reproduces speech based on a confirmation request phoneme sequence of "disupurei deiidesuka" meaning "it is disupurei, isn't it?". Accordingly, the speech recognition apparatus 1 requests the user to orally return whether the recognized and corrected phoneme sequence "disupurei" is correct as the recognition result".

Reference symbol C8 represents that the user returns speech of "yes". Accordingly, the user orally returns an affirmative pattern of "hai" representing that the recognition result in C3 is correct.

Figure 13:
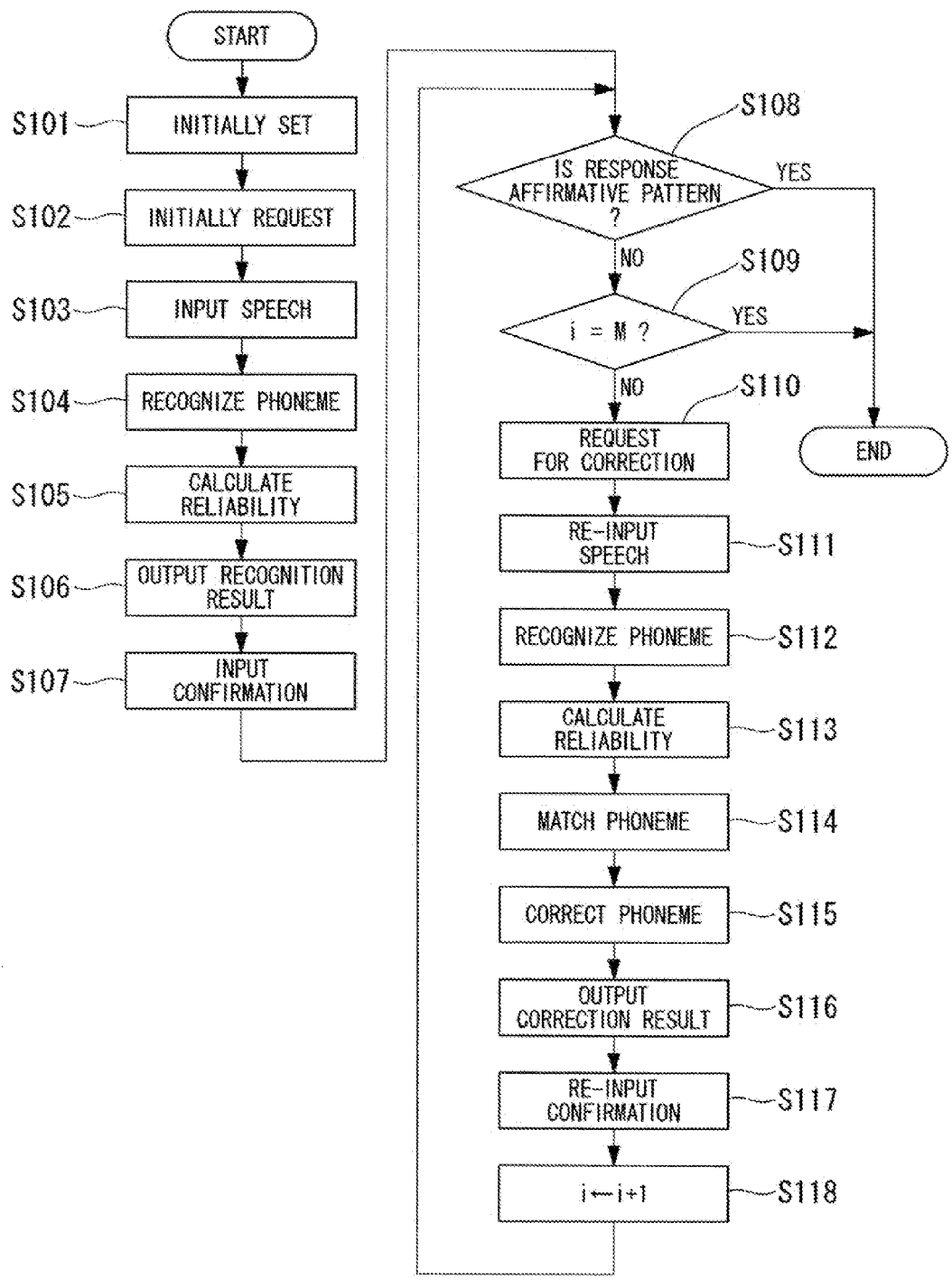
FIG. 13 is a flow diagram illustrating the flow of a speech recognition process in the speech recognition apparatus according to the first embodiment.

The speech recognition apparatus 1 performs the flow of processes shown in FIG. 13 to embody such a dialogue. FIG. 13 is a flow diagram illustrating the flow of the speech recognition process according to the first embodiment.

In step S101, the speech recognition apparatus 1 initializes variables used to perform the speech recognition method. For example, the dialogue processing unit 106 sets the number of times M for requesting the user to orally return a correct phoneme sequence to 6 and sets a variable i for counting the number of responses to 1. Thereafter, the flow goes to step S102.

In step S102, the dialogue processing unit 106 reads an initial request pattern from the dialogue response pattern storage section 204. The dialogue processing unit 106 outputs the read initial request pattern as an initial request phoneme sequence to the speech reproducing unit 107.

The speech reproducing unit 107 generates a speech signal from the initial request phoneme sequence input from the dialogue processing unit 106 using the known text-speech synthesizing method. The speech reproducing unit 107 reproduces speech based on the generated speech signal (for example, C1 in FIG. 12). Accordingly, the speech recognition apparatus 1 can urge the user to orally return a phoneme sequence to be recognized.

In step S103, the speech input unit 101 receives a speech signal based on the speech (for example, C2 in FIG. 12) uttered by the user and outputs the received speech signal to the phoneme recognition unit 102. Thereafter, the flow goes to step S104.

In step S104, the phoneme recognition unit 102 calculates a speech feature quantity from the speech signal input from the speech input unit 101. The phoneme recognition unit 102 recognizes phonemes representing the user's pronunciation based on the calculated speech feature quantity using a known speech recognition method and generates a phoneme sequence including the recognized phonemes. The phoneme recognition unit 102 outputs the generated phoneme sequence and a speech feature vector which is time-series data of the calculated speech feature quantity to the dialogue processing unit 106.

The dialogue processing unit 106 performs a matching process on the phoneme sequence input from the phoneme recognition unit 102 and the response pattern information (see FIG. 11) read from the dialogue response pattern storage section 204 and determines a response pattern that most closely matches with the input phoneme sequence. In the matching process, the dialogue processing unit 106 uses the endpoint free DP matching method.

When the determined response pattern information is the initial response pattern (see FIG. 11), the dialogue processing unit 106 recognizes that the phoneme sequence input from the phoneme recognition unit 102 is a phoneme sequence including a correct phoneme sequence. At this time, the dialogue processing unit 106 extracts the << . . . >> part of the initial response pattern corresponding to the phoneme sequence input from the phoneme recognition unit 102 and sets the part as a new first phoneme sequence. The dialogue processing unit 106 extracts a new speech feature vector corresponding to the new first phoneme sequence from the speech feature vector input from the phoneme recognition unit 102. The dialogue processing unit 106 outputs the new first phoneme sequence and the new speech feature vector to the reliability calculating unit 103. Thereafter, the flow goes to step S105.

In step S105, the reliability calculating unit 103 reads the probability $P(x_1^T)$ of the speech feature vector $x_1^T$ input from the dialogue processing unit 106 and the conditional probability $P(x_{sm}^{tm}|u_m)$ of each phoneme $u_m$ of the phoneme sequence input from the phoneme recognition unit 102 with respect to the corresponding part $x_{sm}^{tm}$ of the speech feature vector from the phoneme acoustic model storage section 201. The reliability calculating unit 103 calculates the reliability, for example, the GPP, using Expression 1 based on the read probability $P(x_1^T)$ and the read conditional probability $P(x_{sm}^{tm}|u_m)$.

The reliability calculating unit 103 reads the correct answer rate corresponding to the GPP calculated for each phoneme of the phoneme sequence from the correct answer rate storage section 202. The reliability calculating unit 103 outputs the phoneme sequence and the GPP and the correct answer rate for each phoneme of the phoneme sequence to the matching unit 104.

The matching unit 104 receives the phoneme sequence and the GPP and the correct answer rate for each phoneme of the phoneme sequence from the reliability calculating unit 103 and stores the input phoneme sequence and the input GPP and correct answer rate for each phoneme of the phoneme sequence. Here, the phoneme sequence input from the reliability calculating unit 103 is set as a second phoneme sequence. Thereafter, the flow goes to step S106.

In step S106, the dialogue processing unit 106 receives the phoneme sequence from the phoneme recognition unit 102 and reads a confirmation request pattern from the dialogue response pattern storage section 204. The dialogue processing unit 106 inserts the input phoneme sequence into the part of < . . . > of the confirmation request pattern and generates a confirmation request phoneme sequence. The dialogue processing unit 106 outputs the generated confirmation request phoneme sequence to the speech reproducing unit 107. The speech reproducing unit 107 reproduces speech (for example, C3 in FIG. 12) based on the speech signal generated from the confirmation request phoneme sequence input from the dialogue processing unit 106. Accordingly, the speech recognition apparatus 1 orally outputs the recognition result to the user and urges the user to orally respond whether the recognition result is correct. Thereafter, the flow goes to step S107.

In step S107, the speech input unit 101 receives a speech signal (for example, C4 in FIG. 12) based on the speech returned by the user and outputs the input speech signal to the phoneme recognition unit 102. The phoneme recognition unit 102 calculates the speech feature quantity from the speech signal input from the speech input unit 101.

The phoneme recognition unit 102 recognizes the phonemes representing the user's pronunciation based on the calculated speech feature quantity using the known phoneme recognition method and generates a phoneme sequence including the recognized phonemes. The phoneme recognition unit 102 outputs the generated phoneme sequence to the dialogue processing unit 106.

The dialogue processing unit 106 performs a matching process on the phoneme sequence input from the phoneme recognition unit 102 and the response pattern information read from the dialogue response pattern storage section 204 and determines a response pattern that most closely matches with the input phoneme sequence. Thereafter, the flow goes to step S108.

In step S108, the dialogue processing unit 106 determines whether the determined response pattern is one of the affirmative patterns. When it is determined that the response pattern is one (for example, C8 in FIG. 12) of the affirmative patterns (YES in step S108), that is, when it is determined that the second phoneme sequence input to the matching unit 104 is correct as the recognition result, the dialogue processing unit 106 stores the phoneme sequence in the word storage section 205. Thereafter, the flow of processes is ended.

When the dialogue processing unit 106 determines that the response pattern is not an affirmative pattern (for example, C4 in FIG. 12) (NO in step S108), that is, when the second phoneme sequence input to the matching unit 104 is incorrect as the recognition result, the flow goes to step S109.

In step S109, the dialogue processing unit 106 determines whether the count number i reaches the number of repetitions M. When the dialogue processing unit 106 determines that the count number i reaches the number of repetitions M (YES in step S109), the flow of processes is ended. When the dialogue processing unit 106 determines that the count number i does not reach the number of repetitions M (NO in step S109), the flow goes to step S110.

In step S110, the dialogue processing unit 106 reads a correction request pattern from the dialogue response pattern storage section 204. The dialogue processing unit 106 outputs the correction request pattern to the speech reproducing unit 107 as a correction request phoneme sequence.

The speech reproducing unit 107 generates a speech signal from the correction request phoneme sequence input from the dialogue processing unit 106 using the known text-speech synthesizing method. The speech reproducing unit 107 reproduces speech (for example, C5 in FIG. 12) based on the generated speech signal. Accordingly, it is possible to urge the user to orally return a phoneme sequence to be corrected. Thereafter, the flow goes to step S111.

In step S111, the speech input unit 101 receives a speech signal based on the speech (for example, C6 in FIG. 12) uttered by the user again and outputs the input speech signal to the phoneme recognition unit 102. Thereafter, the flow goes to step S112.

In step S112, the phoneme recognition unit 102 calculates a speech feature quantity from the speech signal input from the speech input unit 101. The phoneme recognition unit 102 recognizes the phonemes based on the calculated speech feature quantity using the known phoneme recognition method and generates a phoneme sequence including the recognized phonemes. The phoneme recognition unit 102 outputs the generated phoneme sequence and a speech feature vector including time-series data of the calculated speech feature quantity to the dialogue processing unit 106.

The dialogue processing unit 106 performs a matching process on the phoneme sequence input from the phoneme recognition unit 102 and the response pattern information read from the dialogue response pattern storage section 204 and determines a response pattern that most closely matches with the input phoneme sequence. When the response pattern is determined as a correction response pattern, the dialogue processing unit 106 extracts the << . . . >> part of the correction response pattern corresponding to the phoneme sequence input from the phoneme recognition unit 102 and sets the extracted part as a new first phoneme sequence. The dialogue processing unit 106 extracts a new speech feature vector corresponding to the new first phoneme sequence from the speech feature vector input from the phoneme recognition unit 102. The dialogue processing unit 106 outputs the new first phoneme sequence and the new speech feature vector to the reliability calculating unit 103. Thereafter, the flow goes to step S113.

In step S113, the first phoneme sequence and the speech feature vector are input to the reliability calculating unit 103 from the dialogue processing unit 106.

The reliability calculating unit 103 reads the probability $P(x_1^T)$ of the speech feature vector $x_1^T$ input from the dialogue processing unit 106 from the phoneme acoustic model storage section 201. The reliability calculating unit 103 reads the conditional probability $P(x_{sm}^{tm}|u_m)$ of each phoneme $u_m$ of the first phoneme sequence input from the dialogue processing unit 106 with respect to the corresponding part $x_{sm}^{tm}$ of the speech feature quantity from the phoneme acoustic model storage section 201. The reliability calculating unit 103 calculates the GPP as an indicator of the reliability using Expression 1 based on the read probability $P(x_1^T)$ and the conditional probability $P(x_{sm}^{tm}|u_m)$. The reliability calculating unit 103 reads the correct answer rate corresponding to the GPP calculated for each phoneme of the phoneme sequence from the correct answer rate storage section 202 and determines the read correct answer rate as another indicator of the reliability. The reliability calculating unit 103 outputs the first phoneme sequence and the correct answer rate for each phoneme of the first phoneme sequence to the matching unit 104. Thereafter, the flow goes to step S114.

In step S114, the matching unit 104 receives the first phoneme sequence and the correct answer rate for each phoneme of the first phoneme sequence from the reliability calculating unit 103. The matching unit 104 performs the matching process on the first phoneme sequence and the second phoneme sequence, for example, using the endpoint free DP matching method. The matching unit 104 generates the matching information representing the correspondence relationship between the first phoneme sequence and the second phoneme sequence, which minimizes the cumulative distance calculated based on the confusion matrix information read from the confusion matrix storage section 203 in the matching process. The matching unit 104 outputs the first phoneme sequence, the second phoneme sequence, the generated matching information, and the correct answer rate for each phoneme of the phoneme sequences to the phoneme correcting unit 105. Thereafter, the flow goes to step S115.

In step S115, the phoneme correcting unit 105 corrects the second phoneme sequence input from the matching unit 104 based on the first phoneme sequence, the matching information, and the correct answer rate and determines a corrected phoneme sequence. Here, when a phoneme included in the first phoneme sequence is different from the corresponding phoneme included in the second phoneme sequence, the phoneme correcting unit 105 determines the phoneme having a higher correct answer rate as the phoneme included in the corrected phoneme sequence.

When a phoneme included in the first phoneme sequence is equal to the corresponding phoneme included in the second phoneme sequence, the phoneme correcting unit 105 determines the phoneme as the phoneme included in the corrected phoneme sequence. When a phoneme corresponding to the phoneme included in the second phoneme sequence does not exist in the first phoneme sequence, the phoneme correcting unit 105 determines the phoneme included in the second phoneme sequence as the phoneme included in the corrected phoneme sequence. However, when the correct answer rate corresponding to the phoneme included in the second phoneme sequence is smaller than a predetermined value, the phoneme correcting unit 105 does not add the phoneme to the corrected phoneme sequence but excludes the corresponding phoneme.

The phoneme correcting unit 105 determines the corrected phoneme sequence corresponding to the second phoneme sequence and then outputs the determined corrected phoneme sequence and the correct answer rate for each phoneme included in the phoneme sequence to the matching unit 104. The matching unit 104 sets the corrected phoneme sequence as a new second phoneme sequence. The phoneme correcting unit 105 outputs the corrected phoneme sequence (second phoneme sequence) to the dialogue processing unit 106. Thereafter, the flow goes to step S116.

In step S116, the dialogue processing unit 106 reads a confirmation request pattern from the dialogue response pattern storage section 204 in response to the input of the corrected phoneme sequence (second phoneme sequence) from the phoneme correcting unit 105. The dialogue processing unit 106 inserts the corrected phoneme sequence into the confirmation request pattern and generates a confirmation request phoneme sequence. The dialogue processing unit 106 outputs the confirmation request phoneme sequence to the speech reproducing unit 107.

The speech reproducing unit 107 generates a speech signal from the confirmation request phoneme sequence input from the dialogue processing unit 106 using the known text-speech synthesizing method, and reproduces speech (for example, C7 in FIG. 12) based on the generated speech signal. Accordingly, it is possible to urge the user to orally return whether the corrected phoneme sequence is correct as the recognition result. Thereafter, the flow goes to step S117.

In step S117, the speech input unit 101 receives a speech signal based on the speech (for example, C8 in FIG. 12) returned from the user and outputs the input speech signal to the phoneme recognition unit 102. The phoneme recognition unit 102 calculates a speech feature quantity from the speech signal input from the speech input unit 101.

The phoneme recognition unit 102 recognizes phonemes representing the user's pronunciation based on the calculated speech feature quantity using the known phoneme recognition method and generates a phoneme sequence including the recognized phonemes. The phoneme recognition unit 102 outputs the generated phoneme sequence and a speech feature vector which is time-series data of the calculated speech feature quantity to the dialogue processing unit 106.

The dialogue processing unit 106 performs a matching process on the phoneme sequence input from the phoneme recognition unit 102 and the response pattern information read from the dialogue response pattern storage section 204 and determines a response pattern that most closely matches with the input phoneme sequence. Thereafter, the flow goes to step S118.

In step S118, the dialogue processing unit 106 increases the variable i for counting the number of responses from the user by 1. Thereafter, the flow goes to step S108.

The confusion matrix information stored in the confusion matrix storage section 203 may be a predetermined value stored in advance, but is not limited to such a value. When it is determined that the corrected phoneme sequence is correct, the matching unit 104 may update the confusion matrix information based on the phonemes included in the phoneme sequences involved in the phoneme correcting process in the phoneme correcting unit 105 just before.

Specifically, the matching unit 104 may perform the following processes. When the dialogue processing unit 106 determines that the determined response pattern information is one of the affirmative patterns in step S108 (YES in step S108), the second phoneme sequence input to the matching unit 104, that is, the corrected phoneme sequence, is correct as the recognition result. Accordingly, the matching unit 104 adds 1 to the frequency indicated by a matrix element of a confusion matrix having phonemes common to the first phoneme sequence (based on the speech lastly input) out of the phonemes included in the second phoneme sequence (to be corrected) as input phonemes γ and recognized phonemes α, respectively, in the recently performed step S115 (phoneme correcting process). The matching unit 104 sets the added value as the frequency of the matrix element.

For example, when the first phoneme sequence is "φa" and the second phoneme sequence is "ba", 1 is added to the value 92229 of the matrix element of which the input phoneme γ is a and the recognized phoneme α is a to result in 92230.

As described above, when the dialogue processing unit 106 determines that the determined response pattern information is one of the affirmative patterns (YES in step S108), the phoneme included in the second phoneme sequence and corrected in step S115 is incorrect as the recognition result. Accordingly, the matching unit 104 adds 1 to the frequency indicated by a matrix element of a confusion matrix having phonemes (correct recognition result) replaced for the phonemes included in the first phoneme sequence (based on the last speech input) out of the phonemes included in the second phoneme sequence (to be corrected) as input phonemes γ and having the non-corrected phonemes (recognition error) as recognized phonemes α in the recently performed step S115. The matching unit 104 sets the added value as the frequency of the matrix element.

For example, when the first phoneme sequence is "φa" and the second phoneme sequence is "ba", 1 is added to the value 169 of the matrix element of which the input phoneme γ is b and the recognized phoneme α is φ to result in 170. Accordingly, the confusion matrix having the frequencies at which the input phoneme γ is recognized as the recognized phoneme α as elements is adapted to use environments such as the user's utterance characteristic or echo, thereby reducing the frequency at which the recognition error occurs. It is possible to more smoothly correct the phonemes using the speech input from the user.

As described above, according to the first embodiment of the invention, the dialogue shown in FIG. 12 is carried out between the speech recognition apparatus 1 and the user, whereby it is possible to correct the recognized phoneme based on only the speech input from the user.

Since the phoneme correcting unit 105 corrects a phoneme into the phoneme selected based on the reliability for each phoneme included in the phoneme sequence, it is possible to correct a phoneme into a phoneme of which the reliability is proved. The phoneme correcting unit 105 determines that there is a recognition error when the correct answer rate of the phoneme included in the phoneme sequence is low, whereby it is possible to avoid the correction into a phoneme with a low correct answer rate.

Here, the verification result of a correct word rate and a correct phoneme accuracy using 40 words by the use of the speech recognition apparatus 1 will be described. The number of trials is 100 for each word. The correct word rate is a rate of the number of trials in which a correct phoneme sequence is recognized to the total number of trials. The correct phoneme accuracy is a rate of the number of phonemes, which is obtained by subtracting the number of replaced phonemes $C_S$, the number of missing phonemes $C_D$, and the number of inserted phonemes $C_I$ from the number of true phonemes $C_N$ in the total number of trials to the number of true phonemes $C_I$.

However, the phoneme recognition unit 102 does not correct the lengths of vowels and considers long vowels and short vowels as the same vowels in the input phonemes γ and the recognized phonemes α. The confusion matrix information stored in the confusion matrix storage section 203 is a predetermined value stored in advance.

Here, the matching unit 104 determines the matching result from the distances between the first phoneme sequence and the second phoneme sequence, which are calculated based on the probability for each recognized phoneme of the first phoneme sequence, thereby implementing the matching process in consideration of the recognition error.

The dialogue processing unit 106 reproduces speech based on the corrected phoneme sequence and stores word information including the corrected phoneme sequence or reproduces speech urging the user to utter speech depending on the response represented by the input speech. Accordingly, since the user is urged to orally respond to the corrected phoneme sequence and the word information including the phoneme sequence corrected by the response is registered or the user is urged again to utter speech, it is possible to smoothly correct the phoneme recognition error using only the user's speech.

Figure 14:
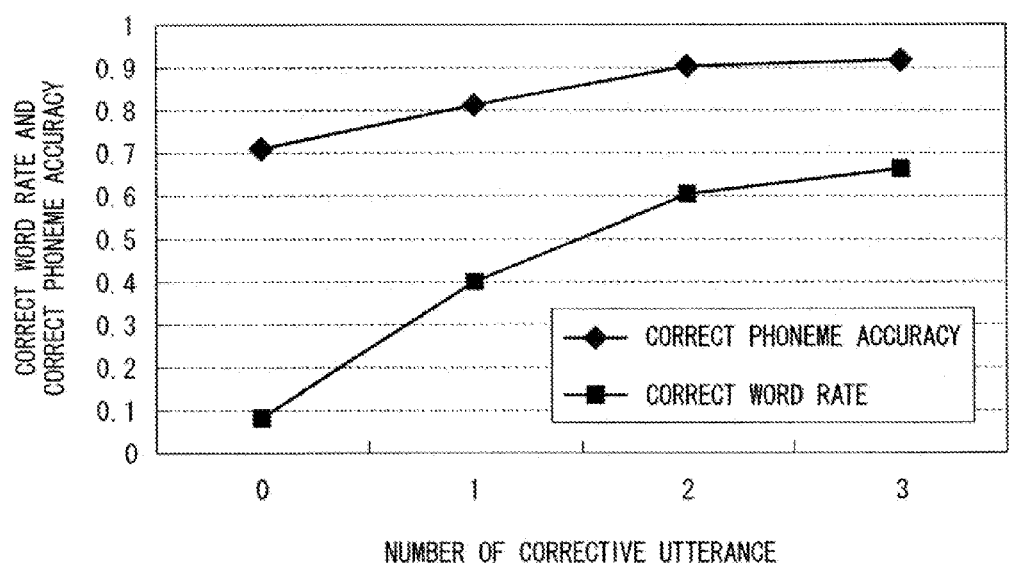
FIG. 14 is a diagram illustrating relationships between a correct word rate and a correct phoneme accuracy in the speech recognition apparatus according to the first embodiment.

FIG. 14 is a diagram illustrating an example of the correct word rate and the correct phoneme accuracy in the speech recognition apparatus 1. In FIG. 14, the vertical axis represents the correct word rate and the correct phoneme accuracy. The horizontal axis represents the number of correcting utterances, that is, the repetition number M. Here, as the number of correcting utterances increases, the correct word rate and the correct phoneme accuracy are improved. For example, when the number of correcting utterances is zero, the correct word rate is 8% and the correct phoneme accuracy is 70%. When the number of correcting utterances is 1, the correct word rate 40% and the correct phoneme accuracy is 80%. When the number of correcting utterances is 2, the correct word rate 60% and the correct phoneme accuracy is 90%. When the number of correcting utterances is 3, the correct word rate 66% and the correct phoneme accuracy is 92%. This verification result shows that the speech recognition apparatus 1 can improve the entire recognition rate of a phoneme sequence by repeating the speech-based dialogue with the user even when it can correctly recognize phonemes partially but cannot correctly recognize the phonemes as a whole. Accordingly, the speech recognition apparatus 1 can smoothly register an unknown word representing a phoneme sequence only by performing a speech-based dialogue with the user.

Second Embodiment

Figure 15:
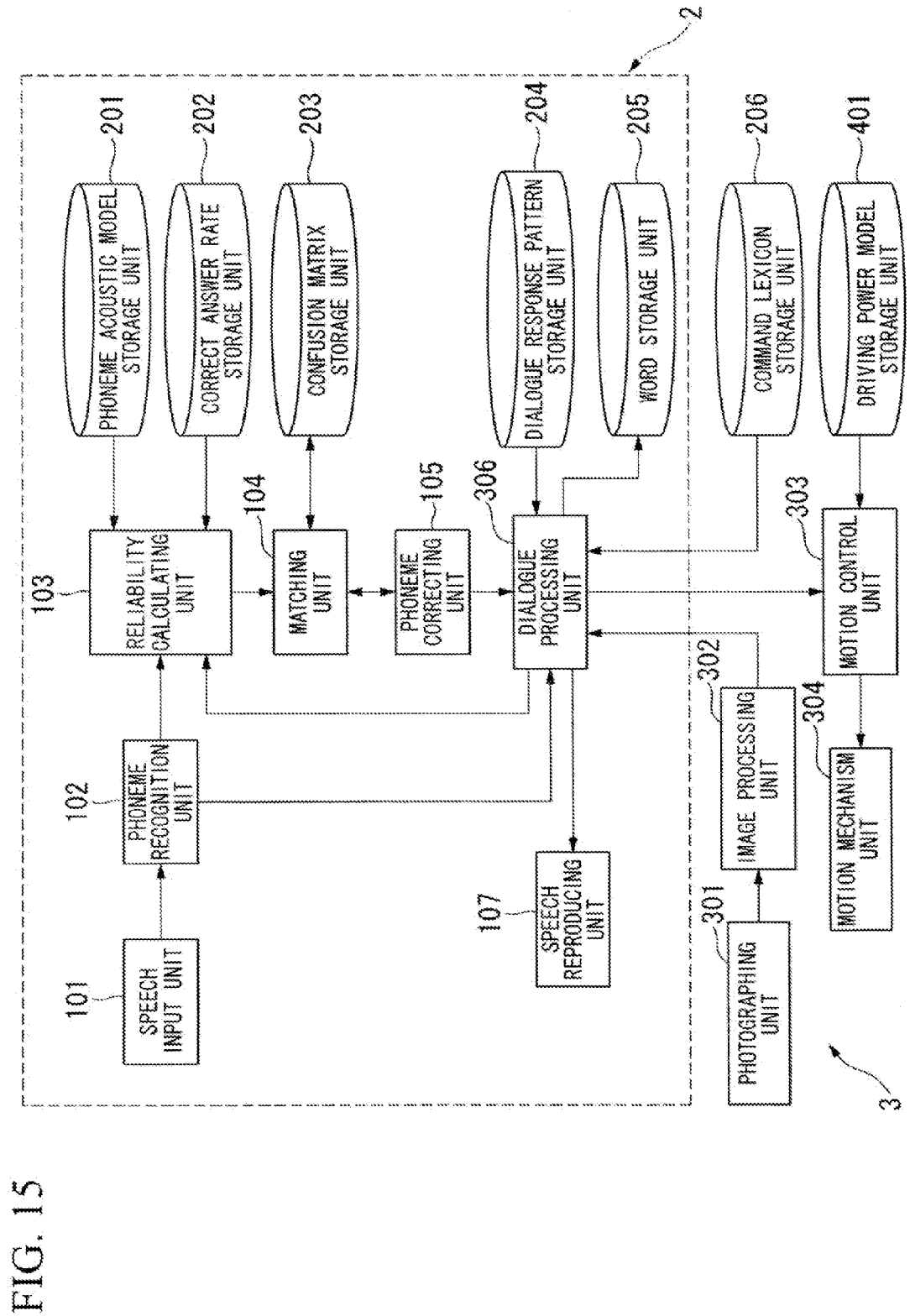
FIG. 15 is a diagram schematically illustrating the configuration of a speech recognition apparatus according to a second embodiment of the invention.

A second embodiment of the invention will be described below with reference to the accompanying drawing. FIG. 15 is a diagram schematically illustrating the configuration of a speech recognition robot 3 according to the second embodiment of the invention. In FIG. 15, the speech recognition robot 3 includes a command lexicon storage section 206, a photographing unit 301, an image processing unit 302, a motion control unit 303, a motion mechanism unit 304, and a driving power model storage section 401, in addition to a speech recognition apparatus 2. The speech recognition apparatus 2 is different from the speech recognition apparatus 1 in that it includes a dialogue processing unit 306 instead of the dialogue processing unit 106, and is equal thereto in the other configurations and operations. The main differences from the first embodiment will be described below.

The command lexicon storage section 206 stores robot command information including word information representing an object to be operated and position information thereof. A part or all of the word information stored in the command lexicon storage section 206 is a replica of the phoneme sequence stored in the word storage section 205. Accordingly, the speech recognition apparatus 2 can compensate for the robot command information by the above-mentioned speech recognition process.

The dialogue processing unit 306 performs a matching process on the phoneme sequence input from the phoneme recognition unit 102 and the word information read from the command lexicon storage section 206 and determines the word information that most closely matches with the input phoneme sequence. The dialogue processing unit 306 reads the robot command information corresponding to the determined word information from the command lexicon storage section 206 and outputs the read robot command information to the motion control unit 303.

The driving power model storage section 401 stores power model information correlated with the word information and position information representing an object and time-series data of power to be supplied to a mechanism unit constituting a part of the motion mechanism unit 304 in advance.

The motion control unit 303 receives the robot command information from the dialogue processing unit 306.

The motion control unit 303 reads the power model information corresponding to the word information and position information included in the input robot command information from the driving power model storage section 401 and determines the time-series data of power to be supplied to the mechanism unit. The motion control unit 303 supplies power to the mechanism unit based on the determined time-series data of power. The mechanism unit means, for example, a manipulator or a multi-finger grasper.

When a component supplied with power from the motion control unit 303 works, the motion mechanism unit 304 including the mechanism unit performs an operation corresponding to the robot command including the word information indicated by the phoneme sequence uttered by a user.

The photographing unit 301 captures an analog image signal and outputs the captured analog image signal to the image processing unit 302.

The image processing unit 302 converts the analog image signal input from the photographing unit 301 in an analog-to-digital (A/D) conversion manner and generates a digital image signal.

The image processing unit 302 calculates an image feature quantity from the generated digital image signal. The calculated image feature quantity is, for example, an outline (edge) of an object. In order to calculate the outline, for example, differences in pixel value between adjacent pixels in the horizontal direction and the vertical direction are calculated and a filtering process is performed so as to exclude components equal to or higher than a predetermined frequency from the absolute values of the calculated differences. The outline is determined based on some pixels of the image signals having a pixel value higher than a predetermined value out of the image signals having been subjected to the filtering process.

The image processing unit 302 outputs the calculated image feature quantity to the dialogue processing unit 306.

The dialogue processing unit 306 stores the image feature quantity input from the image processing unit 302 in the command lexicon storage section 206 as the robot command information including the word information corresponding to the phoneme sequence input from the phoneme recognition unit 102. For example, when a user utters a name (word information) of an object while causing the photographing unit 301 to photograph the object, it is possible to compensate for the calculated image feature quantity as a part of the robot command information. Accordingly, it is possible to obtain a clue for identifying the captured image as the robot command information, as well as the speech uttered by the user.

That is, the dialogue processing unit 306 performs the matching process on the image feature quantity input from the image processing unit 302 and the image feature quantity included in the robot command information stored in the command lexicon storage section 206, as well as the phoneme sequence. For example, the dialogue processing unit 306 determines the robot command information including the image feature quantity and being that most closely matches with the image feature quantity input from the image processing unit 302 and outputs the determined robot command information to the motion control unit 303.

Accordingly, since the speech recognition robot 3 can identify a robot command suitable for a situation by means of image recognition as well as speech recognition which may cause a recognition error, the user can orally give the speech recognition robot 3 the optimal action command.

As described above, it is possible to correct phonemes recognized based on only speech uttered by a user through the use of a dialogue between the speech recognition robot 3 according to the second embodiment and the user and to compensate for a robot command based on the corrected phonemes. In addition, it is possible to easily extend the functions of the speech recognition robot 3. By using the image information therewith, it is possible to optimize an action command given to the robot from the user.

In the above-mentioned embodiments, the phonemes, the phoneme sequences, the request patterns, and the response patterns in Japanese are employed, but the invention is not limited to Japanese. In the above-mentioned embodiments, phonemes, phoneme sequences, request patterns, and response patterns in other languages such as English may be employed.

A part of the speech recognition apparatuses 1 and 2 according to the above-mentioned embodiments, such as the reliability calculating unit 103, the matching unit 104, the phoneme correcting unit 105, the dialogue processing units 106 and 306, and the image processing unit 302, may be embodied by a computer. In this case, the part may be embodied by recording a program for performing the control functions in a computer-readable recording medium and causing a computer system to read and execute the program recorded in the recording medium. Here, the "computer system" is built in the speech recognition apparatuses 1 and 2 and the speech recognition robot 3 and includes an OS or hardware such as peripherals. Examples of the "computer-readable recording medium" include memory devices of portable mediums such as a flexible disk, a magneto-optical disc, a ROM, and a CD-ROM, a hard disk built in the computer system, and the like. The "computer-readable recording medium" may include a recording medium dynamically storing a program for a short time like a transmission medium when the program is transmitted via a network such as the Internet or a communication line such as a phone line and a recording medium storing a program for a predetermined time like a volatile memory in a computer system serving as a server or a client in that case. The program may embody a part of the above-mentioned functions. The program may embody the above-mentioned functions in cooperation with a program previously recorded in the computer system.

Part or all of the speech recognition apparatuses 1 and 2 and the speech recognition robot 3 according to the above-mentioned embodiments may be embodied as an integrated circuit such as an LSI (Large Scale Integration). The functional blocks of the speech recognition apparatuses 1 and 2 and the speech recognition robot 3 may be individually formed into processors and a part or all thereof may be integrated as a single processor. The integration technique is not limited to the LSI, but they may be embodied as a dedicated circuit or a general-purpose processor. When an integration technique taking the place of the LSI appears with the development of semiconductor techniques, an integrated circuit based on the integration technique may be employed.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A speech recognition apparatus comprising
a storage medium storing a relationship between a recognition reliability and a correct answer rate for every phoneme; and
a processor programmed with instructions that, when executed, cause the processor to:
receive speech;
recognize phonemes of the speech and generate a first phoneme sequence representing corrected speech;
match the first phoneme sequence with a second phoneme sequence representing original speech so as to create a pair of a first phoneme extracted from the first phoneme sequence and a second phoneme extracted from the second phoneme sequence; and
replace the second phoneme with the first phoneme when the second phoneme differs from the first phoneme, a predetermined recognition reliability of the first phoneme is higher than a predetermined recognition reliability of the second phoneme, and a correct answer rate of the first phoneme determined based on the relationship stored in the storage medium is higher than a predetermined value.

2. The speech recognition apparatus according to claim 1, wherein the processor is further programmed with instructions that, when executed, cause the processor to calculate distances between the phonemes of the first phoneme sequence and the phonemes of the second phoneme sequence based on a frequency of each set of phoneme types recognized as the types of phonemes included in the input speech and to determine the matching result based on the distances.

3. The speech recognition apparatus according to claim 1, further comprising a dialogue response pattern storage medium storing response patterns representing the recognition result, wherein the processor is further programmed with instructions that, when executed, cause the processor to:
reproduce speech based on the corrected second phoneme sequence;
and
perform one of a process of storing word information including the corrected second phoneme sequence in a word storage medium and a process of reproducing speech urging a user to utter speech based on the response pattern matched with the phonemes of the input speech.

4. A speech recognition robot comprising the speech recognition apparatus according to claim 1.

5. A speech recognition method, comprising:
storing, in a storage medium, a relationship between a recognition reliability and a correct answer rate for every phoneme;
receiving speech;
recognizing phonemes of the speech;
generating a first phoneme sequence representing corrected speech;
matching the first phoneme sequence with a second phoneme sequence representing original speech so as to create a pair of a first phoneme extracted from the first phoneme sequence and a second phoneme extracted from the second phoneme sequence; and
replacing the second phoneme with the first phoneme when the second phoneme differs from the first phoneme, a predetermined recognition reliability of the first phoneme is higher than a predetermined recognition reliability of the second phoneme, and a correct answer rate of the first phoneme determined based on the relationship stored in the storage medium is higher than a predetermined value.

* * * * *